(12) United States Patent
Dobak et al.

(10) Patent No.: US 10,661,204 B2
(45) Date of Patent: May 26, 2020

(54) FILTER BAG SEALING METHOD AND A FILTER BAG SEALED THEREWITH

(71) Applicant: REMARK-KAYSER Sp. z.o.o., Tarnowo Podgorne (PL)

(72) Inventors: Stefan Dobak, Poznan (PL); Piotr Dobak, Poznan (PL); Tomasz Tyszkiewicz, Przezmierowo (PL)

(73) Assignee: REMARK-KAYSER Sp. z.o.o., Tarnowo Podgórne (PL)

( * ) Notice: Subject to any disclaimer, the term of this patent is extended or adjusted under 35 U.S.C. 154(b) by 45 days.

(21) Appl. No.: 15/564,705

(22) PCT Filed: Apr. 11, 2016

(86) PCT No.: PCT/PL2016/000039
§ 371 (c)(1),
(2) Date: Oct. 5, 2017

(87) PCT Pub. No.: WO2016/167678
PCT Pub. Date: Oct. 20, 2016

(65) Prior Publication Data
US 2018/0071661 A1    Mar. 15, 2018

(30) Foreign Application Priority Data
Apr. 15, 2015 (PL) .......................................... 412004

(51) Int. Cl.
*B01D 46/00* (2006.01)
*B01D 29/27* (2006.01)
(Continued)

(52) U.S. Cl.
CPC ......... *B01D 29/27* (2013.01); *B01D 29/0029* (2013.01); *B01D 29/11* (2013.01);
(Continued)

(58) Field of Classification Search
CPC .. B01D 46/00; B01D 46/0001; B01D 24/001; B01D 25/001; B01D 27/005;
(Continued)

(56) References Cited

U.S. PATENT DOCUMENTS 3,419,151 A   12/1968   Smith et al.
5,156,661 A   10/1992   Adiletta
(Continued)

FOREIGN PATENT DOCUMENTS

GB   2168906 A    7/1986
WO   03053678 A1  7/2003

OTHER PUBLICATIONS

International Search Report of the ISA (EPO), dated Jun. 24, 2016.
Search Report of the Polish Patent Authority dated May 17, 2016.

*Primary Examiner* — T. Bennett McKenzie
(74) *Attorney, Agent, or Firm* — Patshegen IP LLC; Moshe Pinchas

(57) ABSTRACT

A method of sealing a filter bag at the stitched joints of the filtration material, consisting in forming the filter bag out of at least one filtration material piece, whereupon the surface of at least one filtration material edge being joined is covered with a liquid or semi-liquid layer of a sealant in such a way that the filtration material edges being joined are in contact with one another at least on the surface covered with the sealant. After the sealant layer has been applied, the filter bag elements prepared beforehand are combined together permanently by sewing them with a thread. A filter bag formed of at least one filtration material piece whose edges (2) and (3) are joined together with a thread (5), with at least one stitch, is characterised by the fact that at the stitched places between the adjoining surfaces of the filtration material edges (2) and (3) being combined there is a sealant layer (4), applied before sewing.

3 Claims, 4 Drawing Sheets

(51) Int. Cl.
  *B01D 29/11* (2006.01)
  *B01D 29/00* (2006.01)
  *B01D 39/16* (2006.01)
  *B01D 27/00* (2006.01)
  *B01D 24/00* (2006.01)
  *B01D 25/00* (2006.01)
  *B01D 29/01* (2006.01)
  *B01D 33/00* (2006.01)

(52) U.S. Cl.
  CPC ........ *B01D 29/111* (2013.01); *B01D 39/1623* (2013.01); *B01D 46/0001* (2013.01); *B01D 24/001* (2013.01); *B01D 25/001* (2013.01); *B01D 27/005* (2013.01); *B01D 29/0006* (2013.01); *B01D 29/0093* (2013.01); *B01D 29/012* (2013.01); *B01D 33/0093* (2013.01)

(58) Field of Classification Search
  CPC ............ B01D 29/0006; B01D 29/0093; B01D 29/012; B01D 29/111; B01D 29/0029; B01D 29/11; B01D 29/27; B01D 33/0093; B01D 39/1623
  USPC .................................................. 55/361–382
  See application file for complete search history.

(56) References Cited

U.S. PATENT DOCUMENTS

| | | | |
|---|---|---|---|
| 5,205,938 A * | 4/1993 | Fiumano | B01D 46/02 210/232 |
| 2011/0097579 A1 * | 4/2011 | Mizuno | C09J 183/04 428/355 R |

\* cited by examiner

FILTER BAG SEALING METHOD AND A FILTER BAG SEALED THEREWITH

The subject of the invention is a sealing method of a baghouse filter bag and a filter bag sealed therewith.

BACKGROUND OF THE INVENTION

Filter bags made of various materials and of various designs are used in the dust collecting equipment as well as technological devices and are meant for dust separation or product transportation. They are used in almost all branches of industry: energy and fuel, metallurgical, electromechanical, electronic, chemical, light, food, pharmaceutical, wood, paper industries.

The sealing method of a baghouse filter bag's material joints, known from the American patent description no. U.S. Pat. No. 5,156,661 consists in joining the filtration material edges by a seam, and subsequently sealing of the stitched place by covering the seam and both adjacent filtration material edges joined together with a thermoplastic tape, and then welding the tape with the filtration material.

What is commonly used for a filter bag seams' lamination is a polytetrafluoroethylene PTFE tape. A single or multi-layered PTFE tape is applied on the outside, working side of the bag, at the stitched place, and then it undergoes high temperature exposure, up to approx. 800° C.

Such a method of a filter bag sealing cannot be applied in case of use of low temperature resistance filtration materials. PTFE laminate can basically be used only for filtration materials made of PTFE fibres or ones covered with PTFE membrane. In case of the remaining filtration materials, made of fibres other than PTFE, seam covering is possible only when using PTFE tape with a glue layer. A disadvantage to such a solution is a low temperature resistance of the glue used in the PTFE tape and also that it cannot be used for joining the majority of the filtration materials made of fibres other than PTFE fibres.

Another method for sealing the places of filtration material joints in a filter bag consists in covering the seams with a silicone layer. The silicone is applied on filter bag elements combined together or on a ready-made filter bag at the stitched places, similarly as in case of the PTFE tape use.

A disadvantage to both solutions where a PTFE laminate or a silicone layer is applied on the outside surface of a filter bag is a low mechanical resistance of the sealing and easiness of its detachment from the bag surface, and as a consequence—a filter integrity loss and likelihood of the product contamination with sealing bits coming off. In the solutions used the sealing layer is applied on a ready-made bag what makes it difficult to cover all the joint points of the filtration material effectively. Besides, in some bag designs, the solutions used do not grant efficient sealing of the inter-material spaces at the places where the edges of the material being joined do not overlap, e.g. in bags with a round bottom sewn in.

Baghouse filter bags can be made of one or several filtration material pieces, joined together permanently with a thread stitch in the way securing the best possible seam tightness.

The simplest design is known from the American patent description no. U.S. Pat. No. 4,959,045. A rectangular filtration material piece is folded along the line parallel to the rectangle's axis which is moved slightly from this axis so that one material edge protrudes slightly beyond the other one after sewing. The protruding edge is bent to cover the shorter edge and finished with an overlock seam.

The bottom part of the bag is combined in the same way, while the top part remains open. In some solutions the open top bag edge is turned inside out and sewn to create a tunnel. A filter bag design frequently used is an open tube shape which is obtained by sewing the longer sides of the rectangular filtration material piece together and sewing in a round element on one side, creating the bottom. A tunnel with inside elements meant for the bag installation in the filtration unit can be sewn to the open top part of the tube. All filtration material joints are sealed with the methods described above.

BRIEF SUMMARY OF THE INVENTION

The object of the invention was to design an efficient method of a filter bag sealing and a filter bag sealed therewith, free of the disadvantages described above.

A filter bag sealing method where: a filter bag is formed from at least one filtration material piece, the filtration material edges being joined are sewn with a thread and the stitched places are sealed, is characterised by the fact that the surface of at least one filtration material edge being joined is covered with a liquid or semi-liquid layer of the sealant, whereupon the filtration material edges are combined to adjoin one another at least on the surface covered with the sealant, and the joined filtration material edges are sewn together after the sealant has been applied.

It is advantageous when the sealant is a liquid or semi-liquid silicone.

A filter bag formed from at least one filtration material piece whose edges are joined permanently with a thread, with at least one stitch, is characterised by the fact that at the stitched places, between the adjoining surfaces of the filtration material edges being combined there is a sealant layer, applied before sewing.

It is advantageous when the filtration material is a filtration fabric, non-woven or needle felt.

The filter bag sealing method according to the invention ensures efficient sealing of all the filtration material joint points, eliminates the direct exposure of the sealing to the products and media used in the filtration process and related likelihood of the product contamination with the sealing material. It also ensures a longer sealing lifetime and can be used in bags of all types and designs, made of any filtration materials and joined by sewing.

BRIEF DESCRIPTION OF THE SEVERAL VIEWS OF THE DRAWINGS

The filter bag sealing method according to the invention and the design of the filter bag sealed therewith will be explained more thoroughly on the basis of the execution example shown in the drawing, where.

DETAILED DESCRIPTION OF THE INVENTION

Figure 1:
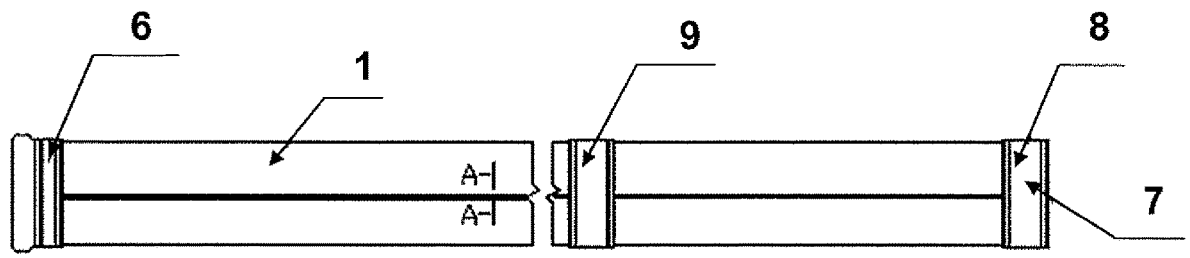
FIG. 1 shows a filter bag's view, FIG. 2—the filter bag's cross section along A-A lines, FIG. 3—a filter bag's fragment view in the axial section from the bottom side, FIG. 4—a filter bag's fragment view in the axial section from the open bag part side, and FIG. 5—a filter bag's fragment view in the axial section at the bag's reinforcement.
Figure 2:
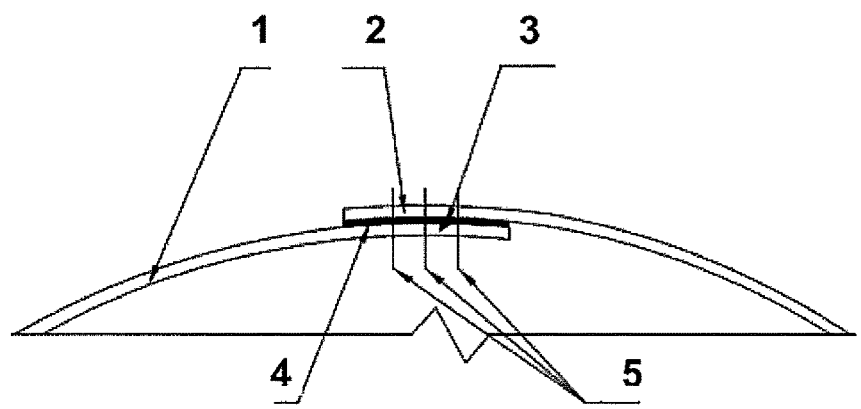
Figure 3:
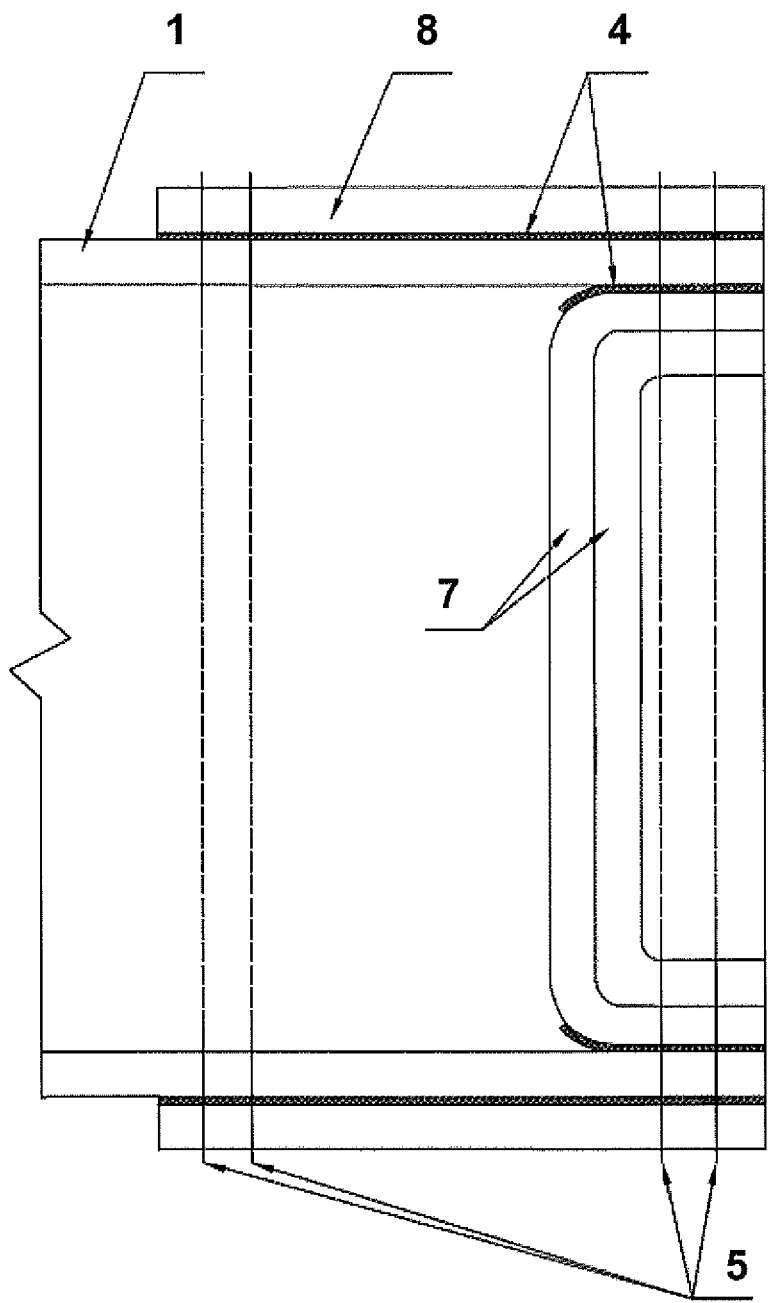
Figure 4:
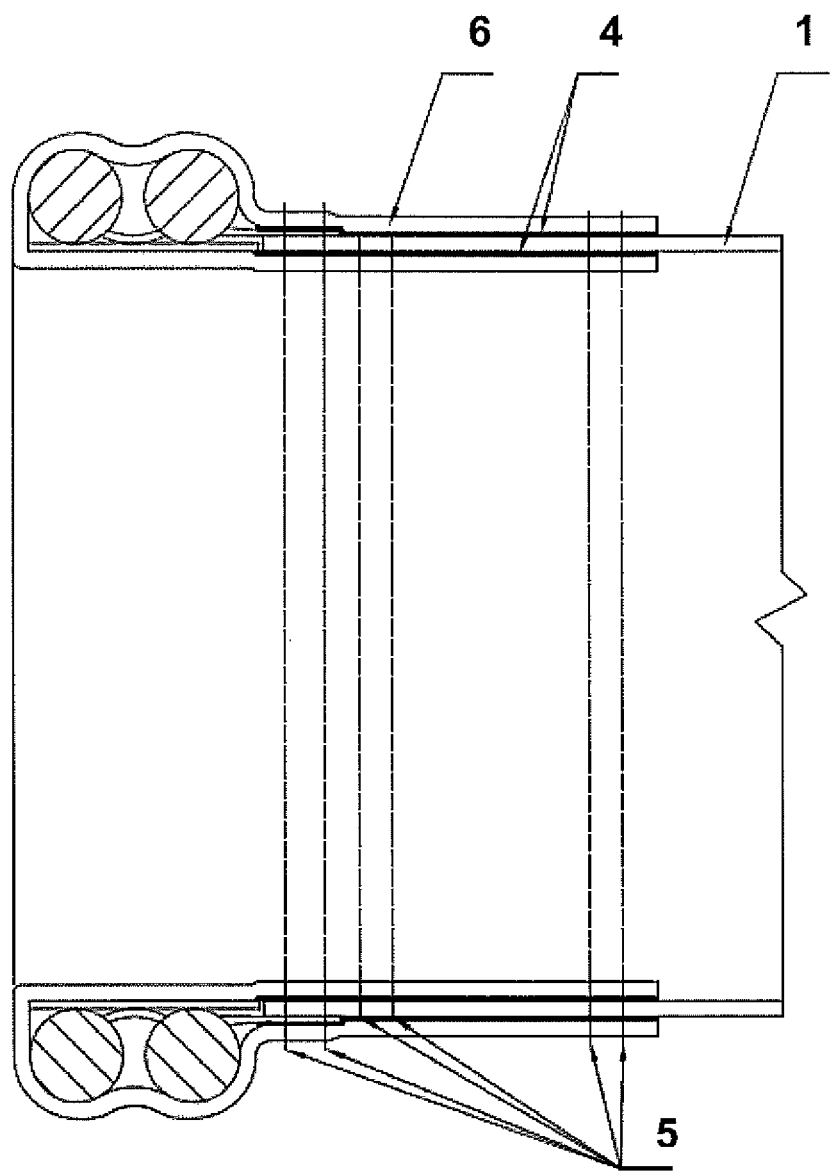
Figure 5:
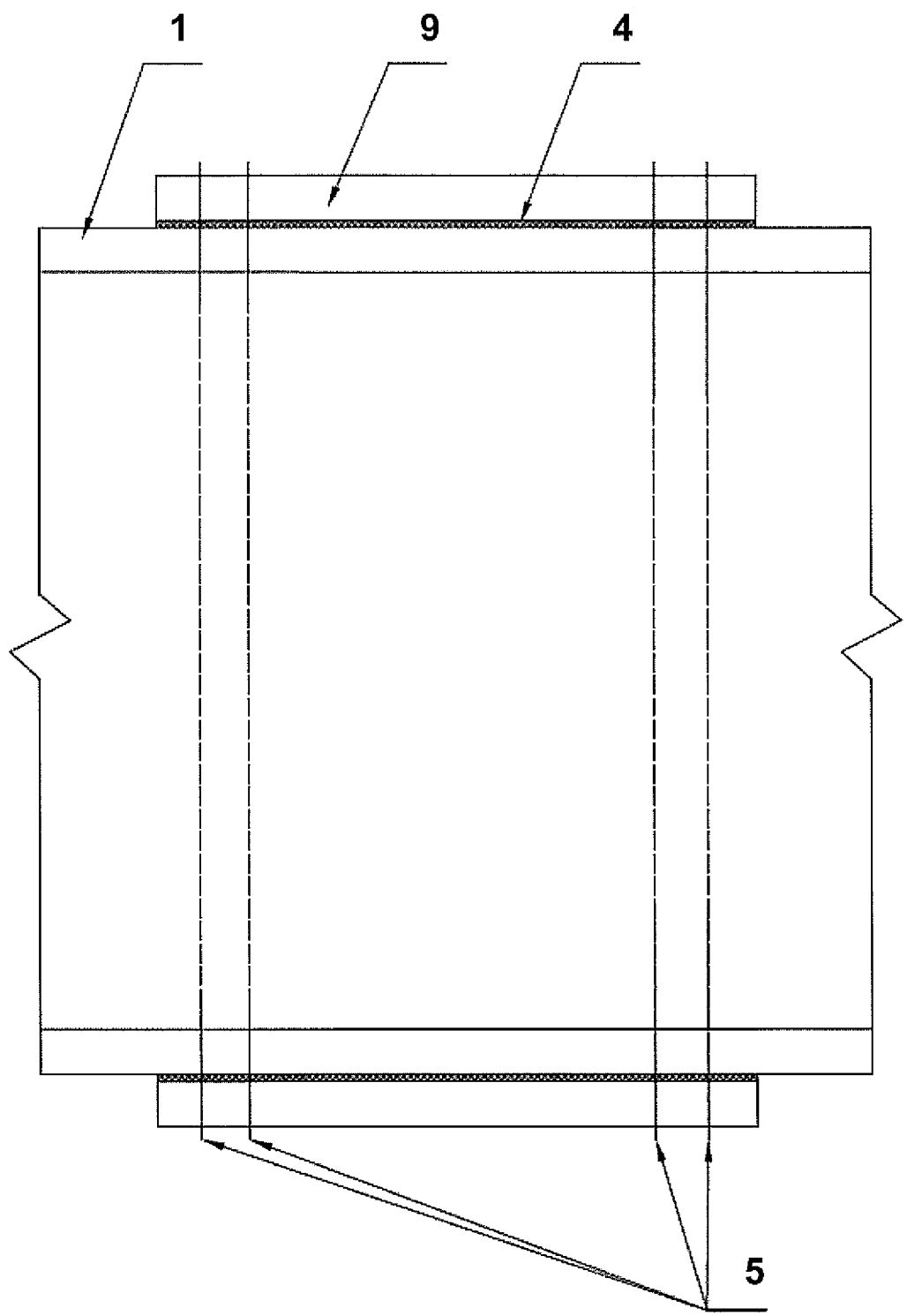

The tube 1 is formed from a rectangular filtration fabric piece by overlapping the longer sides of the filtration fabric 2 and 3. Beforehand a liquid or semi-liquid silicone layer 4 is applied on the adjoining surfaces of the filtration fabric edges 2 and 3. After the silicone cures, the overlapping filtration fabric edges, with a silicone layer 4 sealing the bag's joint between them, are sewn together with a thread 5. The puncture places are vulcanised with the silicone during sewing under the influence of the contact with heated needles. Subsequently, a tunnel 6 made of filtration fabric, where: double beaded band and snap band used for hermetic fastening of the bag in the filtration unit are placed, is sewn to the open top tube part 1. In order to do it, a silicone layer 4 is applied on the inner edges of the tunnel 6 and both surfaces of the top edge of the tube 1. After the silicone cures the top edge of the tube 1 is inserted between the edges of the tunnel 6 and both elements being joined: the tunnel 6 and the tube 1 are sewn together with a thread 5. A similar procedure is followed when sewing the filter bag's bottom 7 and reinforcement 8 by the bottom of the tube 1. A silicone layer 4 is applied on both surfaces of the bottom edge of the tube 1, as well as on the edge surface of the round bottom 7 of the tube 1 and on the surface of the reinforcement 8 which after their joining are in contact with the surfaces of the tube 1. After the silicone is cured the afore-mentioned elements are joined in the way shown in FIG. 3, and sewn with a thread 5. The silicone layer 4, especially between the surface of the edge of the bottom 7 adjoining the inner surface of the bottom edge of the tube 1, ensures efficient sealing of the spaces between the layers of the filtration material, which is impossible to achieve while covering the outside surface of the seams with a silicone layer or while laminating the seams with a thermoplastic tape. In order to reinforce the middle part of the filter bag, on the perimeter of the outside surface of the tube a ring 9 made of filtration fabric stripe is sewn on, while beforehand a silicone layer 4 is applied on the adjoining surfaces, and after it cures both elements are sewn together.

The invention claimed is:

1. A method for forming a filter bag the method comprising:
    providing at least two portions of a filtration material each of which having an edge;
    applying an uncured sealing material on the edge of at least one of the two portions;
    overlapping the edges so that said uncured sealing material is provided between the two portions;
    curing said uncured sealing material;
    sewing the two portions of the filtration material and the sealing material together;
    wherein said sewing is carried out after said uncured sealing material is cured and is carried out with a heated needle such that sewing punctures are vulcanized with the sealing material.

2. The method of claim 1, wherein the uncured sealing material is a liquid silicone.

3. The method of claim 1, wherein the two portions of a filtration material are one surface.

* * * * *